US012768344B2

(12) United States Patent
Kohli et al.

(10) Patent No.: US 12,768,344 B2
(45) Date of Patent: Oct. 20, 2026

(54) MANAGING LUBRICATION OF HYDRAULIC FRACTURING PUMPS

(71) Applicant: Halliburton Energy Services, Inc., Houston, TX (US)

(72) Inventors: Madhur Kohli, Houston, TX (US); Timothy Holiman Hunter, Duncan, OK (US); Glenn Howard Weightman, Duncan, OK (US); Bruce Carl Lucas, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 280 days.

(21) Appl. No.: 18/494,624

(22) Filed: Oct. 25, 2023

(65) Prior Publication Data

US 2025/0137448 A1 May 1, 2025

(51) Int. Cl.
*F04B 49/06* (2006.01)
*F16N 13/00* (2006.01)

(52) U.S. Cl.
CPC ............ *F04B 49/065* (2013.01); *F16N 13/00* (2013.01); *F04B 2203/0201* (2013.01); *F04B 2205/14* (2013.01)

(58) Field of Classification Search
CPC .................. F16N 13/00; F04B 2205/14; F04B 2203/0201
See application file for complete search history.

(56) References Cited

U.S. PATENT DOCUMENTS

| | | | | | |
|---|---|---|---|---|---|
| 5,846,056 | A * | 12/1998 | Dhindsa | F04B 49/065 | 73/152.52 |
| 8,814,534 | B2 * | 8/2014 | Ikeda | F16H 61/0021 | 417/44.1 |
| 9,611,728 | B2 | 4/2017 | Oehring | | |
| 10,330,096 | B1 * | 6/2019 | Blake | F01M 1/16 | |
| 10,436,766 | B1 * | 10/2019 | Bayyouk | F04B 17/05 | |
| 10,969,375 | B1 * | 4/2021 | Bayyouk | F16N 29/00 | |
| 11,359,478 | B2 * | 6/2022 | Baskin | E21B 43/2607 | |
| 11,499,547 | B2 * | 11/2022 | Zhang | E21B 43/26 | |
| 2017/0175743 | A1 * | 6/2017 | Dunn | F04C 23/008 | |
| 2022/0364453 | A1 * | 11/2022 | Chang | F04B 19/22 | |
| 2023/0044928 | A1 * | 2/2023 | Harris | F04B 51/00 | |
| 2023/0048551 | A1 * | 2/2023 | Feng | F04B 23/04 | |
| 2023/0392592 | A1 * | 12/2023 | Shampine | E21B 43/2607 | |

FOREIGN PATENT DOCUMENTS

| | | | | |
|---|---|---|---|---|
| EP | 3927973 B1 * | 1/2023 | F04B 49/02 | |
| WO | 2022093676 | 5/2022 | | |

OTHER PUBLICATIONS

"CA Application No. 3,219,427 First Office Action", Mar. 18, 2025, 6 pages.

* cited by examiner

*Primary Examiner* — Christopher S Bobish
(74) *Attorney, Agent, or Firm* — DeLizio, Peacock, Lewin and Guerra, LLP

(57) ABSTRACT

Some implementations include a method for controlling lubrication of a hydraulic fracturing pump. The method may include pumping, via an electric motor and lubrication pump, lubrication oil through the hydraulic fracturing pump at a first flowrate. The method may include increasing flow of the lubrication oil to a second flowrate in response to a detected increase in temperature and/or drop in viscosity of the lubrication oil.

23 Claims, 6 Drawing Sheets

500

| PHASE | DESCRIPTION | EST OIL TEMP. 4.25-IN ROTOR. SHC-632. DEG F | EST VISCOSITY, CST | MSG TO OPERATOR | LUBE PUMP MOTOR CMD FREQ (HZ) | LUBE PUMP MOTOR AMP | FRAC PUMP STATE |
|---|---|---|---|---|---|---|---|
| 1 | CURRENT > 35 (RATED MAX) AND < 50 AMP, RUN FOR MAX 10 MIN (AT 3 HZ). | < 10 | ~ 10000 | Lube Pump Overcurrent | 3 | >35 and <50 | Disabled |
| | IF CURRENT > 35A FOR >10 MINS | | | LUBE PUMP CURRENT LIMIT EXCEEDED | 0 | | |
| | IF LOCKED-ROTOR CAN BE DETECTED OR CURRENT >50 A, STOP DRIVING MOTOR AND ISSUE MESSAGING - ADDITIONAL HEAT NEEDED. | | | LUBE PUMP FAULT | 0 | | |
| 2 | WARM LUBE SYSTEM UNTIL FREQ >= 20 HZ OR TEMP. >=22 DEG F. (HOLD CURRENT AND LET SPEED INCREASE.) | ~ 10 TO 22 | 10000 - 6000 | LUBE SYSTEM NOT READY | 3 TO 20 | ~35 | DISABLED |
| 3 | WARM LUBE SYSTEM AT 20 HZ UNTIL TEMP >50F. OKAY TO SPIN FRAC PUMP AT LOW LOAD (HOLD 20 HZ AND LET TEMPERATURE RISE.) | ~ 22 TO 50 | 6000 - 1800 | "READY LOW LOAD" | 20 | < 35 | ENABLE |
| 4 | VARY LUBE CMD FREQ = 0.8*TEMP.-10 (HZ). OKAY TO SPIN FRAC PUMP UNDER PRESSURE. | > 50 | < 1800 | "READY" | 20-50 | < 35 | ENABLE |
| 5 | NORMAL OPERATING TEMP | 120 TO 180 | 220 - 90 | "READY" | 50 | ~ 18 | ENABLE |
| 6 | OIL TEMPERATURE > SAFE ZONE. OPERATOR TO LOWER PUMP LOAD | > 195 | < 70 | "PUMP LUBE OIL TEMP HIGH" | 50 | ~ 18 | ENABLE |
| 7 | OIL TEMPERATURE > MAX OVER LIMIT FOR 1 MIN. FRAC PUMP SHUT DOWN TRIGGERED | > 205 | < 70 | "PUMP LUBE OIL TEMP VERY HIGH" UNIT SHUT DOWN" | 50 | ~ 18 | DISABLED |

FIG. 5

600

| PHASE | DESCRIPTION | PRESSURE @ GEAR-END | PRESSURE @ POWER-END | MSG TO OPERATOR | LUBE PUMP MOTOR CMD FREQ (HZ) | LUBE PUMP MOTOR AMP | FRAC PUMP STATE |
|---|---|---|---|---|---|---|---|
| 8 | OIL PRESSURE <15 PSI AT GEAR END OR <30 PSI AT POWER END | <15 PSI | <30 PSI | "LUBE PUMP LOW PRESSURE" | MAINTAIN | VARIES | ENABLE |
| 9 | OIL PRESSURE BELOW SAFETY LIMIT FOR >5 SECS AND FRAC PUMP RUNNING | <10 PSI | <10 PSI | "SHUT DOWN BY V LOW LUBE PRESSURE" | MAINTAIN | VARIES | DISABLED |
| 10 | MAIN PUMP MOTION DETECTION VIA MAG PICKUP OR FLUID END STROKE SENSOR | N.A. | N.A. | "PUMP MOTION DETECTED, LUBE PUMP WILL RUN" | MAINTAIN | VARIES | ENABLE |

FIG. 6

MANAGING LUBRICATION OF HYDRAULIC FRACTURING PUMPS

TECHNICAL FIELD

The disclosure generally relates to the field of hydrocarbon exploration, and more specifically to managing lubrication of hydraulic fracturing pumps.

BACKGROUND

Hydraulic fracturing may be facilitated by multiple pumps at different geographical locations. Due to different geographical locations, fracturing pumps may be exposed to a wide range of weather and temperature conditions. However, the fracturing pumps may have many components that cannot withstand a wide range of temperature arising from cold and hot weather. For example, a lubrication pump used for lubricating the gear and casing (power end) of the hydraulic fracturing pump may use lubrication oil whose viscosity may increase as temperature reduces. Even the lubrication oil with lower viscosity grades, such as SHC-629 OR SHC-632 at a lower temperature range, may become too viscous and result in no or slow flow of lubrication oil into the gearbox and power end of the hydraulic fracturing pump. This may eventually damage the lubrication motor (such as an electric motor that drives the lubrication pump) because of torque and/or higher current in such situations. Hence, wide temperature ranges may cause pumping operations to cease, resulting in hours of nonproductive time. Further, wider temperature ranges may damage gears in the power end of the hydraulic fracturing pump. Therefore, there is a need for better lubrication of hydraulic fracturing pumps that operate in wide temperature ranges.

BRIEF DESCRIPTION OF THE DRAWINGS

Implementations of the disclosure may be better understood by referencing the accompanying drawings.

FIG. 5 is a table showing operations that may be performed in response to various conditions.

FIG. 6 is a table showing additional operations that may be performed in response to various conditions.

DESCRIPTION OF IMPLEMENTATIONS

The description that follows may include example systems, methods, techniques, and program flows that embody implementations of the disclosure. However, this disclosure may be practiced without these specific details. For clarity, some well-known instruction instances, protocols, structures, and techniques may not be shown in detail.

Overview

Some implementations relate to a lubrication system for controlling lubrication of a hydraulic fracturing pump used in a downhole hydraulic fracturing environment. Some implementations of the lubrication system may include a lubrication pump that circulates lubrication oil for lubricating a hydraulic fracturing pump ("frac pump"). The lubrication system also may include a lube reservoir, lube pump, lube pump motor, control valves, lube plumbing, and other components for lubricating a frac pump. The lubrication system also may include the hydraulic fracturing pump which may be configured for fracturing subsurface formations in processes for hydrocarbon recovery. The lubrication system also may include temperature sensors, pressure sensors, viscosity sensor, flow sensor, and one or more processors for controlling processes for lubricating the frac pump and other components.

The lubrication system may lubricate gears and the power end of the frac pump at low and high temperatures. In low temperature conditions, the lubrication system may gradually warm-up the lubrication oil by controlling the speed of the lubrication pump. By controlling the speed of the lubrication pump, the lubrication system may gradually transfer energy into the lubrication oil, thus heating the lubrication oil without an external heater. An electric motor may actuate the lubrication pump.

As the oil temperature rises, the electric motor may draw less current to circulate the lubrication oil. As current draw of the electric motor declines, the lubrication system may increase the speed of the electric motor to further increase the temperature of the lubrication oil (transferring more energy into the lubrication oil), causing better lubrication of the fracturing pump. The lubrication system also may present messages indicating the state of the lubrication oil (such as temperature, viscosity, and/or other aspects of the lubrication oil). The lubrication system also may prohibit start-up of the frac pump when oil temperature is below a lower threshold, or the oil is too viscous and shut-down the frac pump when the oil temperature climbs above a higher threshold. The lubrication system may perform additional operations to ensure lubrication of the frac pump-such as running the electric motor to lubricate the frac pump if a sensor detects that a disabled side of the frac pump is turning.

Example Environment

Figure 1:
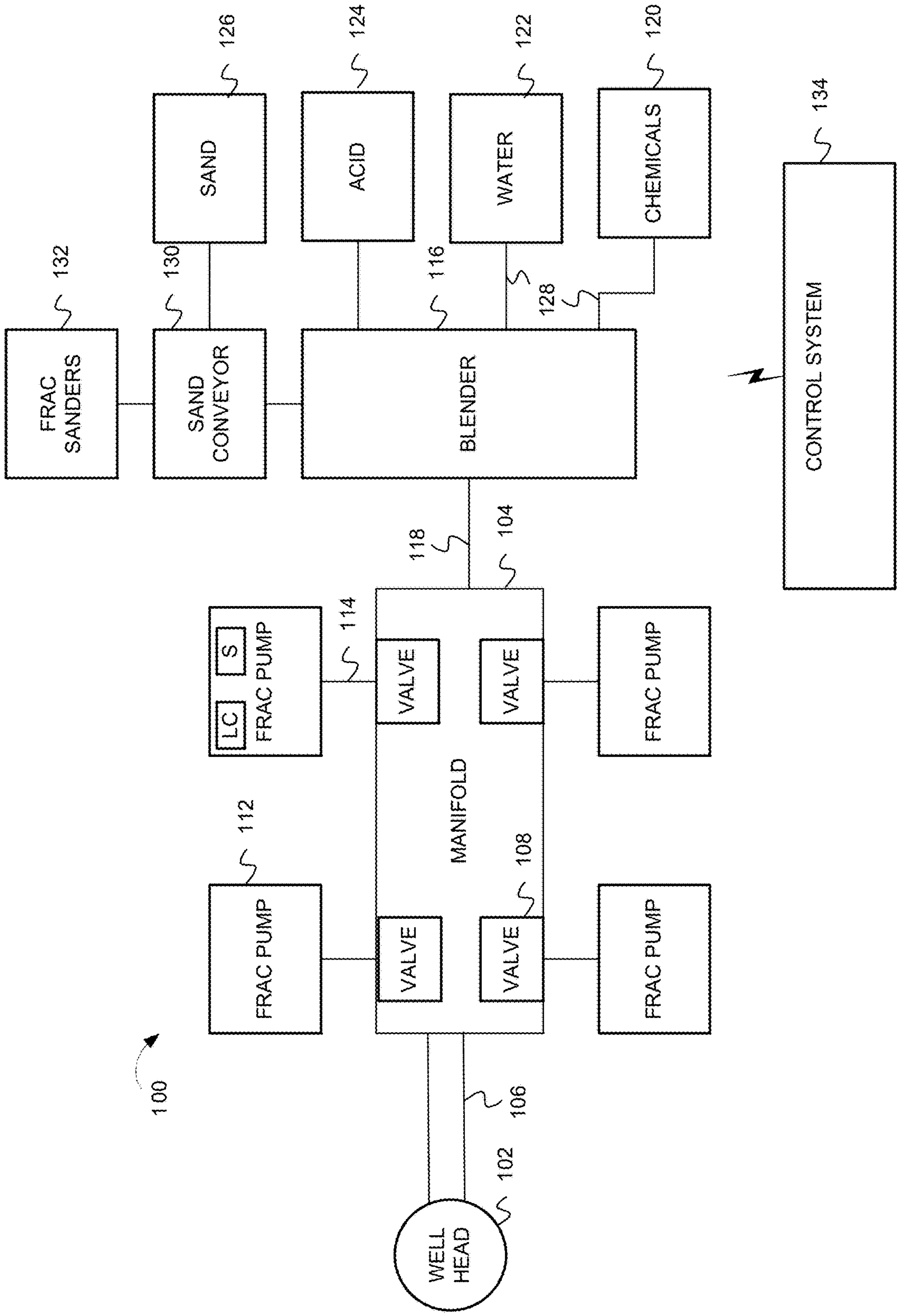
FIG. 1 is a block diagram illustrating a system for hydraulically fracturing subsurface formations in one or more wells.

The lubrication system described herein may be part of a larger system for performing operations for hydraulic fracturing. FIG. 1 is a block diagram illustrating a system for hydraulically fracturing subsurface formations in one or more wells. The system 100 may include a wellhead 102 that is connected to a wellbore. The wellbore (not shown) may be fluidically connected to one or more subsurface formations for the purpose of hydrocarbon recovery. Although FIG. 1 shows only one wellhead 102, there may be any suitable number of wellheads 102 and wells.

The wellhead 102 may be connected to a manifold 104 via piping 106. The piping 106 may include one or more pipes between the wellhead 104 and the manifold 104. Any of the components at the wellsite may include or otherwise be coupled with one or more sensors 103. The manifold 104 may include a plurality of valves 108 and various internal piping (not shown) for performing hydraulic fracturing operations. Any of the valves and components described herein may include or otherwise be coupled with one or more sensors of any suitable type.

The manifold 104 may be connected to one or more frac pumps 112. The frac pumps 112 may include sensors such as temperature sensors, pressure sensors, viscosity sensors, amperage sensors, voltage sensors, flow sensor, and any other suitable sensor type. Each respective frac pump 112 also may include a lubrication controller (show in FIG. 1 as "LC") configured to control lubrication of the respective frac pump 112. Operations of the lubrication controller and other frac pump components are described herein in further detail (for example see description of FIG. 2).

The frac pumps 112 may inject fracturing fluid into the wellbore under specified pressures and at predetermined flow rates. Each pump may be indicative of a single, discrete pumping device, but could alternatively comprise multiple pumps included on or forming part of a pump truck or other pumping platform. All of the frac pumps 112 may or may not be the same type, size, configuration, or from the same manufacturer. Rather, some or all of the frac pumps 112 may be unique in size, output capability, etc.

The manifold 104 also may be connected to a blender 116 via piping 118. The blender 116 may be connected via piping 128 to one or more chemical containers 120, water containers 122, and acid containers 124. The blender 116 also may be connected to a sand conveyor 130, where the sand conveyor 130 may be connected to the container of fracturing sanders 132.

The system 100 also may contain a control system 134 configured to control one or more of the components of the system 100. In some implementations, the control system 134 directly controls the equipment in operations for hydraulic fracturing. However, the control system 134 may interact with various equipment controllers (not shown) and sensors to perform operations related to hydraulic fracturing.

Example Configurations

Figure 2:
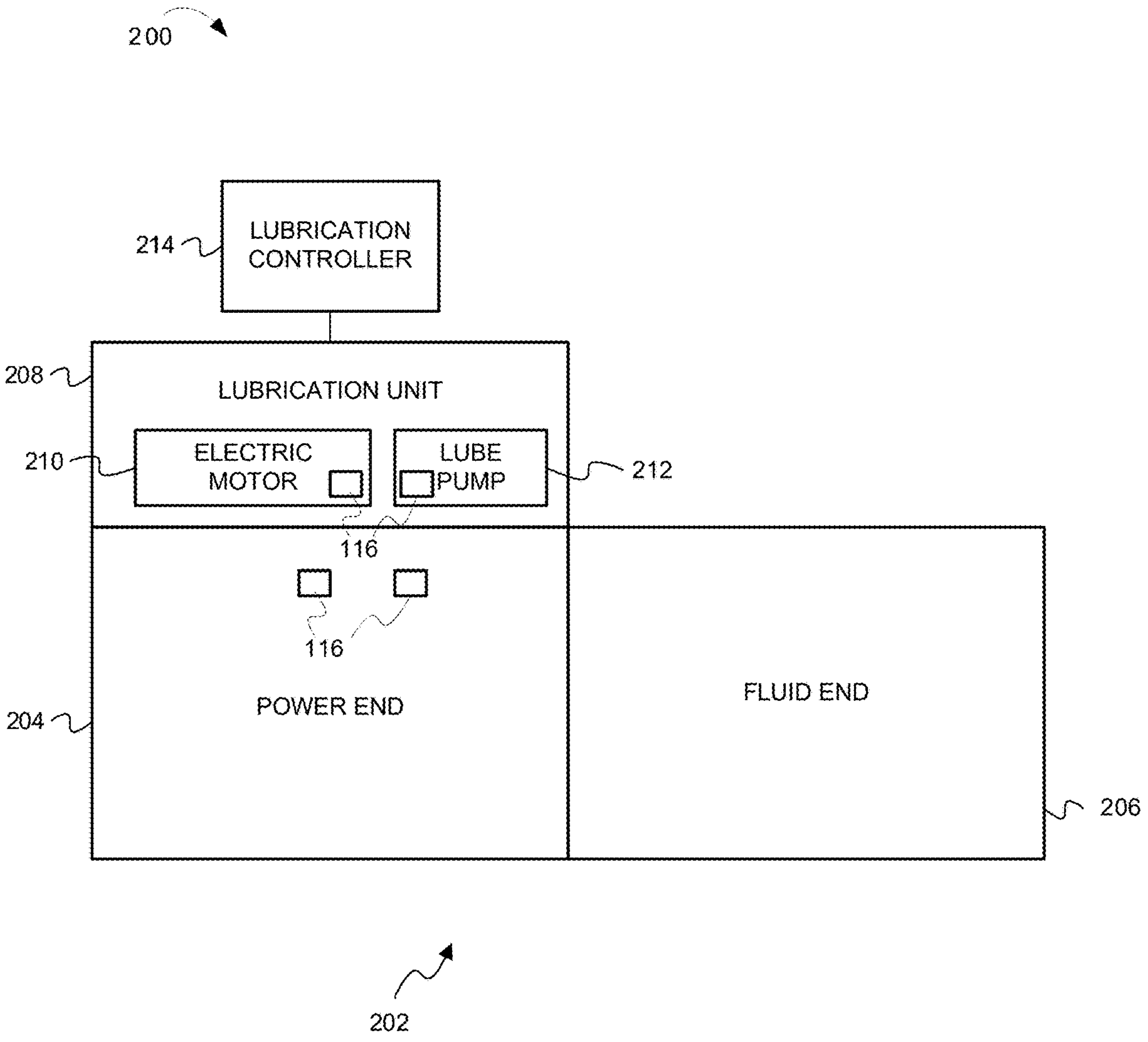
FIG. 2 is a block diagram illustrating an example lubrication system for controlling lubrication of a hydraulic fracturing pump ("frac pump").

FIG. 2 is a block diagram illustrating an example lubrication system for controlling lubrication of a hydraulic fracturing pump ("frac pump"). As shown, the lubrication system 200 may include the frac pump 202 which may include a power end 204 and a fluid end 206. The power end 204 may include components (such as gears, bearings, shafts, etc.) that require lubrication. These components of the power end 204 may be referred to as the "gear box".

A lubrication unit 208 may be coupled with the power end 204. The lubrication unit 208 may include an electric motor 210 that powers a lubrication pump 212 (shown as "lube pump 212"). A variable frequency drive may control operations of the electric motor 210. The lubrication pump 212 may circulate lubrication oil in the power end 204 of the frac pump 202.

A lubrication controller 214 may be coupled with the lubrication unit 208. The lubrication controller 214 may include components (such as circuits, software, processors, etc.) for controlling operation of the lubrication unit 208 to lubricate the gear box and any other components of the frac pump 202 that require or otherwise benefit from lubrication.

Components of the power end 204 (such as the gearbox) may require lubrication when the frac pump 202 is operating. Lubrication may be achieved as the electric motor 210 drives the lubrication pump 212 to circulate lubrication oil in the gearbox.

As temperature reduces, the viscosity of the lubrication oil may increase. Thus, at lower temperature ranges lubrication oil viscosity can be so high that the electric motor 210 may experience an over-torque condition that causes the electric motor 210 to stall and stop circulating the lubrication oil in the power end 204. Inadequate lubrication may cause damage to the electric motor 210, gear box, and other components of the power end 204. Similarly, high oil temperature may damage the power end, gear box, hoses, fittings, and other components.

As temperature increases, the viscosity of the lubrication oil may decrease. In some situations, the lubrication oil viscosity may be too low to provide adequate lubrication. Therefore, at high temperatures, poor lubrication may cause damage to the power end 204 and/or lubrication unit 208.

The lubrication system 200 may control flow of the lubrication oil based on conditions such as oil temperature, air temperature, oil pressure, oil viscosity, and other conditions. The lubrication system 200 also may control flow of lubrication oil based on conditions of the electric motor 210 such as amperage draw of the electric motor 210, torque on the electric motor 210, temperature of components, and other conditions. The power end 204 and lubrication unit 208 may include one or more sensors 216 in any suitable location, where the sensors 216 are configured to measure conditions in the power end 204 and lubrication unit 208. The sensors 216 may include temperature sensors, torque sensors, pressure sensors, ammeters, volt meters, densitometers, viscosity sensors, and/or any other suitable measuring devices.

The lubrication system 200 may control flow of lubrication oil to enable the frac pump 202 to operate at low temperatures with highly viscous lubrication oil. For example, the lubrication controller 214 may detect high lubrication oil viscosity and cause the lubrication unit 210 to pump the lubrication oil at a low flow rate. Such low-flow operation enables the lubrication unit 208 to slowly transfer energy into the highly viscous lubrication oil without stressing the electric motor 210 and lubrication pump 212. During low-flow operation, the electric motor 210 may draw low amperage (such as 3A). As more energy is transferred into the lubrication oil, the lubrication oil viscosity may decrease. As oil temperature increases, the lubrication controller 214 may increase flow of the lubrication oil (as described in more detail herein). Eventually, the lubrication controller 214 may enable transfer of enough energy into the lubrication oil to be in its normal operating temperature range. When the lubrication oil is in its normal temperature range, the electric motor 210 may draw current in its normal range. In addition to controlling oil flow, the lubrication system 200 may present status messages about the lubrication oil, temperature, and other conditions. For example, the lubrication controller 214 may present warnings that the lubrication oil in the power end 204 is approaching a temperature that is too high for adequate lubrication. If the temperature goes beyond a threshold, the lubrication controller 214 may shutdown the frac pump 202 to avoid damage to the power end 204 and gear box.

In some implementations, the primary source of lube oil heating may be the frac pump(s) not the lubrication unit 208. After the frac pump(s) begins turning (even at limited power), the heating requirement may be quickly satisfied, and the lubrication unit 208 may become a cooling system rather than heating system. Hence, the lubrication system 200 has cooling capabilities, because it can remove heat once the hydraulic fracturing pump is in-use.

Example Operations

As temperature of the lubrication oil changes, the lubrication controller 214 may perform different operations for different temperature ranges. The example operations discussed herein may be appropriate for SHC-632 or SHC-634 grade lubrication oil and an electric motor 210 that has 20 or 30 horsepower with a 60 Hz maximum frequency. However, the lubrication system 200 can work with any suitable lubrication oil, and the electric motor 210 can have any suitable horsepower, maximum frequency, and/or other specifications. Hence, one of ordinary skill in the art, with the benefit of this disclosure, will understand that the example operations described herein may vary for different temperature ranges, oils, electric motors, and/or lubrication pumps.

When temperatures are very low (such as less than 10° F.), viscosity of the lubrication oil may be high. To pump lubrication oil at below-normal temperatures (and above-normal viscosity), the electric motor 210 may draw more current and exert more torque on the lubrication pump 212 than at normal operating speed. The excess current and torque could damage the electric motor 210 and/or the lubrication pump 212. Additionally, highly viscous lubrication oil may not flow well enough to adequately lubricate the power end 104 and may cause damage to the frac pump 202. Hence, the lubrication controller 214 may prohibit operation of the frac pump 202 upon detection of a low temperature (such as when temperatures are less than 22° F. or 10° F.). Before enabling operation of the frac pump 202, the lubrication controller 214 may initiate low-flow circulation of the lubrication oil to begin increasing its temperature. The lubrication controller 214 may reduce the electric motor's operating speed to avoid over-current and over-torque conditions on the electric motor 210. The lubrication controller 214 may initiate the electric motor 210 at a very low speed and maintain the low speed for a duration. At low speed, the lubrication pump 212 may transfer enough energy into the lubrication oil to increase the oil temperature. As oil temperature increases, oil viscosity would reduce and produce better lubrication and lower current consumption speed of the electric motor 210.

As an example of how the lubrication controller 214 may manage lubrication oil at temperatures of less than 10° F. or 22° F., the lubrication controller 214 may initiate the electric motor 210 at a portion of its maximum speed such as by running the electric motor 210 at 3 Hz, 5 Hz or 10 Hz for 10 minutes. At temperatures less than 10° F., the lubrication controller 214 also may perform one or more of the following messaging operations: 1) present warning message indicating an electric motor overcurrent condition until current drops below the motor's maximum acceptable current, 2) present warning message indicating the frac pump 202 is disabled because of high viscosity lubrication oil, 3) present a message indicating the electric motor's current consumption has dropped below its maximum limit (such as 35 A).

When lubrication oil temperatures are low (such as ranging from 10° F. to 22° F.), lubrication oil viscosity may be too high (such as approximately 10,800 to 10,000 or 10,000 to 6,000 centistokes (cSt), proportional to temperature) to achieve enough flow to adequately lubricate the frac pump 102. The lubrication controller 214 may start the electric motor 210 at lower-than-normal speed to actuate the lube pump 212 at lower-than-normal speed. As the lubrication oil flows through the frac pump 202, energy is transferred into the lubrication oil and the oil temperature may increase. For example, for oil temperatures from 10° F. to 22° F., the lubrication controller 214 may increase the driving frequency or speed of the electric motor 210 as the lubrication oil temperature rises. For example, if the oil temperature is 10° F., the lubrication controller 214 may begin supplying frequency to the electric motor 210 at 3 Hz, 5 Hz or 10 Hz. As the oil temperature rises, the lubrication controller 214 may proportionally step-up the frequency of the motor up to 20 Hz. Hence, in this example, when the oil temperature reaches 22° F., the motor frequency may be at 20 Hz. In this example, the lubrication controller 214 may initially disable the frac pump 202 because the lubrication oil may initially be too thick to provide adequate lubrication or cause lubrication motor to draw too much current, therefore avoiding damage to the frac pump 202 or electric motor 210. The lubrication controller 214 also may present one or more messages to the operator indicating the lubrication pump is not in a state for providing adequate lubrication to the frac pump 202.

When lubrication oil temperatures are moderate (such as ranging from 22° F. to 50° F.), lubrication oil viscosity may be moderate (such as approximately 6000 to 1800 cSt, proportional to temperature). When lubrication oil temperature (or viscosity) is in the moderate range, the lubrication controller 214 may run the electric motor 210 at 20 Hz until the lubrication oil temperature is 50° F. The lubrication controller 214 may present messages indicating there is adequate lubrication to operate the frac pump 202 at low load. The lubrication controller 114 may enable the frac pump 202 to operate in a low load range (such as at a low flow rate and pressure).

When lubrication oil temperature is in the range of 50° F. to 120° F., the lubrication oil viscosity may be under 1800 cSt, which may be low enough to provide adequate lubrication to the power end 204 of the frac pump 102. Hence, the lubrication controller 214 may enable the frac pump 202 to operate at full load. However, the lubrication controller 214 may operate the electric motor 210 at a speed below its maximum rating. For example, the electric motor 210 may operate at a speed proportional according to the following formula:

$$\text{Command}=0.6*\text{lubrication oil temperature}-10\text{ Hz (proportional to oil temperature)}$$

When executed, the electric motor may perform according to the above-noted equation. The lubrication controller 214 may present messages indicating that the frac pump 202 is ready to operate at full capacity.

When lubrication oil temperature is in the range of 120° F. to 160° F., the lubrication oil viscosity may range from 220 to 90 cSt (which may be inversely proportional to lubrication oil temperature). In this oil temperature range (or viscosity range), the lubrication unit 108 may provide enough lubrication to the frac pump 202 to operate at full capacity. In this temperature (or viscosity) range, the lubrication controller 214 may run the electric motor 210 at full speed (such as at 50 Hz). The lubrication controller 214 may enable the frac pump 202 for operation at full capacity and present messages indicating the frac pump 202 is ready for operation at full capacity.

When lubrication oil temperature is below 195° F., the lubrication oil viscosity may be acceptable (such a above approximately 70 cSt). However, lubrication oil temperatures above 195° F. may be too high for safe long term operation of the power end 204 of the frac pump 202. The lubrication controller 214 may present messages warning the operator to reduce load on the frac pump 202. When lubrication oil temperature is above 195° F., the electric motor 210 may operate at full speed (such as at 50 Hz or 70 Hz).

At high temperatures (such as temperatures greater than 205° F.), the lubrication oil viscosity may be low (such as below 70 cSt). If the lubrication oil temperature exceeds 205° F., the lubrication controller 214 may present messages warning the operator to shut down the frac pump 202. If the lubrication oil temperature remains above 205° F. for more than a short time (such as more than a minute), the lubrication controller 214 may shut down the frac pump 202.

The lubrication controller 214 also may perform other operations for preventing damage to the frac pump 202, electric motor 210, lubrication pump 212, or any other components of the lubrication system 200. To prevent damage, the lubrication controller 214 may monitor oil temperature, oil pressure, oil flow, and other conditions in the lubrication system 200. If monitoring indicates that one or more conditions are outside of acceptable ranges, the lubrication controller 214 may present warning messages and/or shutdown the frac pump 202 to prevent damage to any components of lubrication or pump system 200 (such as the power end 204, the fluid end 206, etc.). For example, if lubrication oil pressure at the gear end of the frac pump 202 is less than 15 PSI or less than 30 PSI at the power end 204, the lubrication controller 214 may present messages warning about low lubrication oil pressure. As another example, if the lubrication oil pressure is less than 10 PSI at the gear end or power end 204 of the frac pump 202 for greater than 5 seconds, the lubrication controller 214 may shutdown the frac pump 202 and issues massages about low lubrication oil pressure. As yet another example, if oil flow falls below a threshold, the lubrication controller 214 may shutdown the frac pump 202 and present messages indicating low oil flow.

In the above-noted examples, the values for pressures, temperatures, and time periods are merely examples as different values may be better suited to different implementations of the frac pump 202 and other components of the lubrication system 200.

In some instances, the lubrication system 200 may include two or more frac pumps 202 that are lubricated by one electric motor 210. In some situations, a frac pump 202 may become disabled, so an operator may run fewer than all frac pumps 202. The lubrication controller 214 may monitor the conditions of the lubrication system 200 to ensure adequate lubrication to all frac pumps 202. For example, if the operator neglected to enable the previously decoupled or the disabled frac pump 202, the lubrication controller may monitor one or more sensors (such as a magnetic pickup sensor, fluid end stroke sensor, and/or any other suitable sensor) to determine which frac pumps 202 are actually enabled/running to ensure that adequate lubrication is provided to those running pumps despite operator not enabling them. If one or more frac pumps 202 have inadequate lubrication, the lubrication controller 214 may modify performance of the electric motor 210 (such as by running the electric motor 210 faster) to achieve the adequate lubrication.

Figure 3:
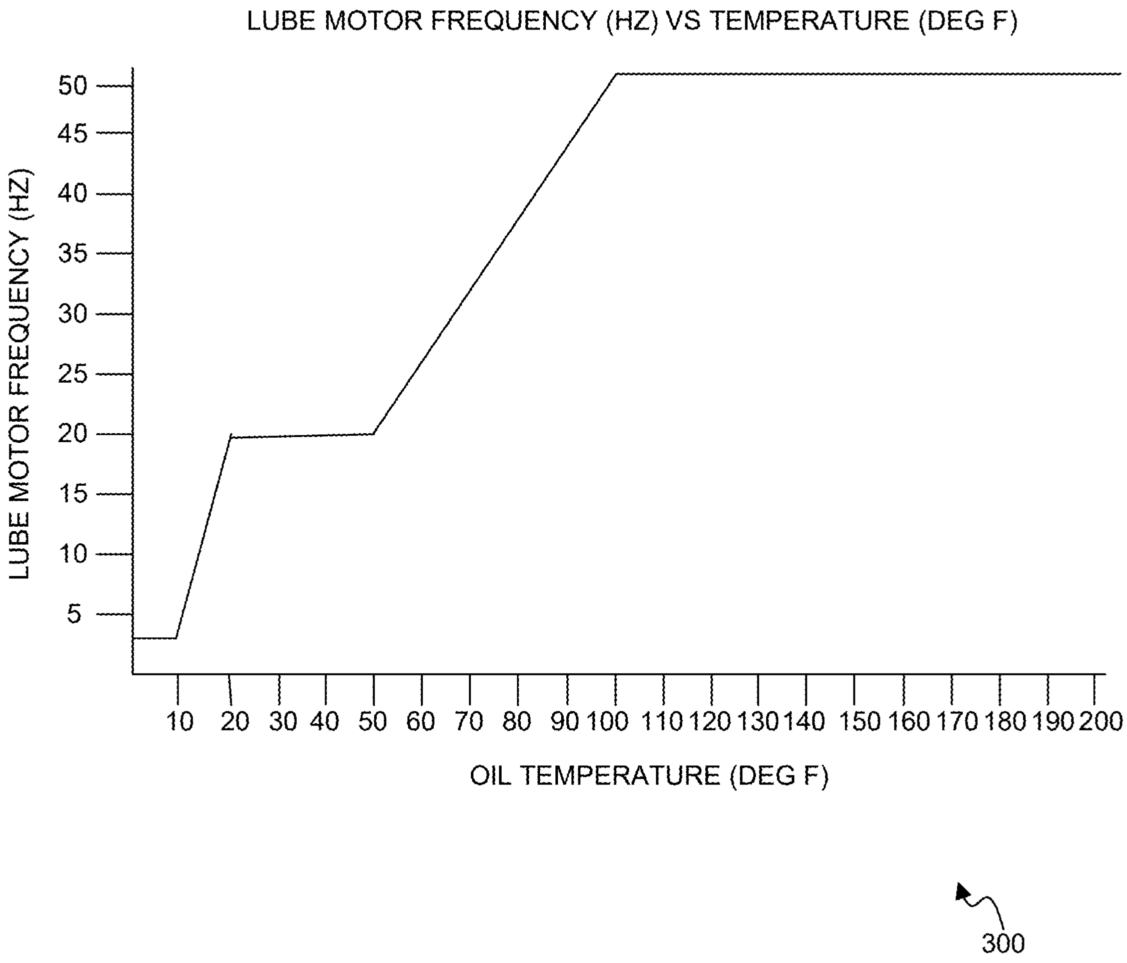
FIG. 3 is a graph showing an example relationship between electric motor frequency and oil temperature.

FIG. 3 is a graph showing an example relationship between electric motor frequency and oil temperature. The graph 300 shows frequency of the electric motor (referred to as "lube motor" in FIG. 3) on the Y-axis and oil temperature (in degrees F.) on the X-axis. The graph 300 shows that the electric motor 210 may operate at 3 Hz when the temperature ranges from 0° F. to 10° F. According to the graph 300, the electric motor 210 may linearly increase its frequency from 3 Hz to 20 Hz as temperature climbs from 10° F. to 20° F. From 20° F. to 50° F., the electric motor 210 may maintain 20 Hz. As temperature climbs from 50° F. to 100° F., the electric motor 210 may linearly increase frequency from 20 Hz to 50 Hz (as shown on the graph 300).

Figure 4:
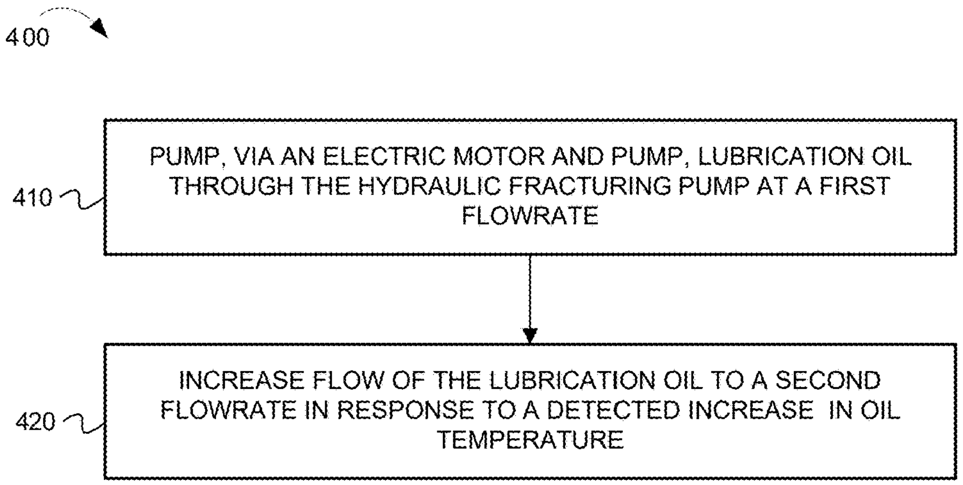
FIG. 4 is a flow diagram illustrating operations for an example method.

FIG. 4 is a flow diagram illustrating operations for an example method. The flow diagram 400 shows operations for a method for controlling lubrication of a hydraulic fracturing pump. At block 410, the lubrication pump and electric motor pump lubrication oil through the hydraulic fracturing pump at a first flowrate. At block 420, the electric motor and lubrication pump increase flow of the lubrication oil to a second flowrate in response to a detected increase in temperature of the lubrication oil. In some implementations, the lubrication controller 214 may control one or more operations shown in FIG. 4.

FIG. 5 is a table showing operations that may be performed in response to various conditions. The table 500 includes 8 columns. From left to right, the columns are titled as follows: column 1—phase; column 2—description of condition and/or response action; column 3—estimated oil temperature, 4.25-in rotor, SHC-632, degrees Fahrenheit; column 4—estimated viscosity, cSt; column 5—message to operator; column 6—lubrication pump motor CMD frequency (Hz); column 7—lubrication pump motor amperage draw; column 8—frac pump state. In the table 500, there are seven rows. Each respective row includes information corresponding to its respective column title. For example, during phase 1, if the electric motor 110 is drawing current at greater than its rated maximum of 35 A, then the lubrication controller 214 may run the electric motor for ten minutes at 3 Hz. Initially, the estimated oil temperature (see column 2) may be less than 10° F., the lubrication oil viscosity may be approximately 10000 cSt. The lubrication controller 214 may present a message indicating that the electric motor 110 is drawing too much current (see column 5). During phase 1, the frac pump 102 is disabled (see column 8). The rest of the table 500 shows various example conditions, responsive operations, and states of the lubrication system 100.

FIG. 6 is a table showing additional operations that may be performed in response to various conditions. The table 600 includes 8 columns. From left to right, the columns are titled as follows: column 1—phase; column 2—description of condition and/or response action; column 3—oil pressure at gear end; column 4—oil pressure at power end; column 5—message to operator; column 6—lubrication pump motor CMD frequency (Hz); column 7—lubrication pump motor amperage draw; column 8—frac pump state. In the table 600, there are seven rows. The phases in table 6 continue at phase 8 (table 500 concluded at phase 7). Each respective row includes information corresponding to its respective column title.

General Comments

FIGS. 1-6 and the operations described herein are examples meant to aid in understanding example implementations and should not be used to limit the potential implementations or limit the scope of the claims. None of the implementations described herein may be performed exclusively in the human mind nor exclusively using pencil and paper. None of the implementations described herein may be performed without computerized components such as those described herein. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the implementations disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more implementations, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, e.g., one or more modules of computer program instructions stored on a computer storage media for execution by, or to control the operation of, a computing device.

If implemented in software, the functions may be stored on or transmitted over as one or more instructions or code on a computer-readable medium. The processes of a method or algorithm disclosed herein may be implemented in a processor-executable instructions which may reside on a computer-readable medium. Computer-readable media includes both computer storage media and communication media including any medium that may be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures and indicate relative positions corresponding to the orientation of the Figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

Example Clauses

Some implementations may include the following clauses.

Clause 1: A method for controlling lubrication of a hydraulic fracturing pump, the method comprising: pumping, via an electric motor and lubrication pump, lubrication oil through the hydraulic fracturing pump at a first flowrate; and increasing flow of the lubrication oil to a second flowrate in response to detecting that a temperature of the lubrication oil is over a temperature threshold or a reduction in current drawn by the electric motor or a decrease in pressure.

Clause 2: The method of clause 1, wherein the flow of the lubrication oil increases from the first flowrate to the second flowrate while current drawn by the electrical motor remains under a threshold.

Clause 3: The method of any one or more of clauses 1-2, wherein current drawn by the electric motor stays under a current threshold for the second flowrate and the first flowrate.

Clause 4: The method of any one or more of clauses 1-3, wherein increasing the flow of lubrication oil to second flow rate occurs in response to a drop in viscosity of the lubrication oil.

Clause 5: The method of any one or more of clauses 1-4 further comprising: detecting that the oil temperature is higher than a threshold temperature; and in response to detecting that the oil temperature is higher than a threshold temperature, enabling the hydraulic fracturing pump to operate at a fraction of its maximum load.

Clause 6: The method of any one or more of clauses 1-5, wherein the electric motor operates at 1/15th or fraction of maximum speed to achieve the first flowrate Clause 7: The method of any one or more of clauses 1-6 further comprising: increasing flow of the lubrication oil to a third flowrate in response to another detected increase in temperature of the lubrication oil.

Clause 8: The method of any one or more of clauses 1-7 further comprising: presenting, on a display device, a warning message about high viscosity and low temperature of the lubrication oil before the pumping begins Clause 9: One or more machine-readable mediums including instructions that, when executed by a processor, for controlling lubrication of a hydraulic fracturing pump, the instructions comprising: instructions to pump, via an electric motor and pump, lubrication oil through the hydraulic fracturing pump at a first flowrate; and instructions to increase flow of the lubrication oil to a second flowrate in response to a detected increase in temperature and/or drop in viscosity of the lubrication oil.

Clause 10: The machine-readable mediums of clause 9, wherein the flow of the lubrication oil increases from the first flowrate to the second flowrate while current drawn by the electrical motor remains constant or while current drawn by the electrical motor remains below a threshold.

Clause 11: The one or more machine-readable mediums of any one or more of clauses 9-10, wherein the electric draws more electrical current at the second flowrate than the first flowrate.

Clause 12: The one or more machine-readable mediums of any one or more of clauses 9-11, instructions to detect that the oil temperature is higher than a threshold temperature; and instructions to, in response to detecting that the oil temperature is higher than a threshold temperature, enable the hydraulic fracturing pump to operate at a fraction of its maximum load.

Clause 13: The one or more machine-readable mediums of any one or more of clauses 9-12, wherein the electric motor operates at a frequency of 3 Hz to achieve the first flowrate.

Clause 14: The one or more machine-readable mediums of any one or more of clauses 9-13, further comprising: instructions to increase flow of the lubrication oil to a third flowrate in response to another detected increase in temperature and/or drop in viscosity of the lubrication oil.

Clause 15: The one or more machine-readable mediums of any one or more of clauses 9-14, further comprising: instructions to present, on a display device, a warning message indicating an electrical current threshold of the electric motor has been exceeded.

Clause 16: An apparatus comprising: a processor; one or more machine-readable mediums including instructions that, when executed by the processor, for controlling lubrication of a hydraulic fracturing pump, the instructions comprising instructions to pump, via an electric motor and pump, lubrication oil through the hydraulic fracturing pump at a first flowrate; and instructions to increase flow of the lubrication oil to a second flowrate in response to a detected increase in temperature and/or drop in viscosity of the lubrication oil.

Clause 17: The apparatus of clause 16 further comprising: instructions to present, while pumping at the lubrication oil at first flow rate, an indication that the lubrication is drawing more electrical current than a current limit.

Clause 18: The apparatus of any one or more of clauses 16-17 wherein the electric motor draws more electrical current at the second flowrate than the first flowrate.

Clause 19: The apparatus of any one or more of clauses 16-18 further comprising: instructions to detect that the oil temperature is higher than a threshold temperature; and instructions to, in response to detecting that the oil temperature is higher than a threshold temperature, enabling the hydraulic fracturing pump to operate at a fraction of its maximum load.

Clause 20: The apparatus of any one or more of clauses 16-19, wherein the electric motor operates at a frequency of 3 Hz to achieve the first flowrate.

Clause 21: The apparatus of any one or more of clauses 16-20 further comprising: instructions to increase flow of the lubrication oil to a third flowrate in response to another detected drop in viscosity of the lubrication oil

What is claimed is:

1. A method for controlling lubrication of a hydraulic fracturing pump, the method comprising:

pumping, in a first phase, via an electric motor and lubrication pump, unless a locked rotor condition for the lubrication pump is detected, lubrication oil through the hydraulic fracturing pump in a disabled state at a first flowrate determined by an operating frequency of approximately 5 Hertz or less for the electric motor after determining that a temperature of the lubrication oil is less than a first temperature threshold;

increasing flow of the lubrication oil, in a second phase, to a second flowrate determined by an increased operating frequency while maintaining the hydraulic fracturing pump in the disabled state in response to detecting that a temperature of the lubrication oil is over the first temperature threshold and below a second temperature threshold;

enabling limited operation of the hydraulic fracturing pump, in a third phase, when the temperature of the lubrication oil exceeds the second temperature threshold or the increased operating frequency exceeds a frequency threshold; and enabling full operation of the hydraulic fracturing pump, in a fifth phase, when the temperature of the lubrication oil exceeds a minimum operating temperature, until the temperature of the lubrication oil exceeds a shutdown temperature in a seventh phase, or until a pressure of the lubrication oil is below a lower limit in an additional phase.

2. The method of claim 1, wherein the flow of the lubrication oil increases from the first flowrate to the second flowrate while current drawn by the electrical motor remains under a threshold.

3. The method of claim 1, wherein the pumping is terminated in the first phase when current drawn by the electric motor exceeds a rated maximum current limit for more than a time limit and no locked rotor condition is detected.

4. The method of claim 1, wherein a frac pump load reduction warning occurs in response to a drop in viscosity of the lubrication oil while the temperature of the lubrication oil approaches the shutdown temperature and the hydraulic fracturing pump operation is enabled, in a sixth phase that is between the fifth phase and the seventh phase.

5. The method of claim 1 further comprising:
detecting, in the third phase, that the temperature of the lubrication oil is higher than the second threshold temperature of approximately 22° F.

6. The method of claim 1, wherein increasing the flow of lubrication oil to the second flow rate occurs in response to a drop in electrical current draw of the lubrication motor, the flow of the lubrication oil to be increased by increasing the speed of the lubrication motor to further increase the temperature of the lubrication oil to transfer more energy into the lubrication oil to reduce viscosity of the lubrication oil to cause better lubrication of the hydraulic fracturing pump.

7. The method of claim 1, wherein the electric motor operates at a fraction of maximum speed determined as a function of the temperature of the lubrication oil, during a fourth phase that is between the third phase and the fifth phase, while the temperature of the lubrication oil exceeds the second temperature threshold.

8. The method of claim 1 further comprising:
increasing the flow of the lubrication oil to a third flowrate in response to another detected increase in temperature of the lubrication oil.

9. The method of claim 1 further comprising:
presenting, on a display device, a warning message about high viscosity and low temperature of the lubrication oil before the pumping begins.

10. One or more machine-readable mediums including instructions that, when executed by a processor, for controlling lubrication of a hydraulic fracturing pump, the instructions comprising:
instructions to pump, in a first phase, via an electric motor and pump, unless a locked rotor condition for the lubrication pump is detected, lubrication oil through the hydraulic fracturing pump in a disabled state at a first flowrate determined by an operating frequency of approximately 5 hertz or less for the electric motor after determining that a temperature of the lubrication oil is less than a first temperature threshold;
instructions to increase flow of the lubrication oil, in a second phase, to a second flowrate determined by an increased operating frequency while maintaining the hydraulic fracturing pump in the disabled state in response to a detected increase in temperature of the lubrication oil over the first temperature threshold and below a second temperature threshold;
instructions to enable limited operation of the hydraulic fracturing pump, in a third phase when the temperature of the lubrication oil exceeds the second temperature threshold or the increased operating frequency exceeds a frequency threshold; and
instructions to enable full operation of the hydraulic fracturing pump, in a fifth phase, when the temperature of the lubrication oil exceeds a minimum operating temperature, until the temperature of the lubrication oil exceeds a shutdown temperature in a seventh phase, or until a pressure of the lubrication oil is below a lower limit in an additional phase.

11. The one or more machine-readable mediums of claim 10, wherein the flow of the lubrication oil increases from the first flowrate to the second flowrate while current drawn by the electrical motor remains constant or while current drawn by the electrical motor remains below a threshold, the flow of the lubrication oil to be increased by increasing the speed of the lubrication motor to further increase the temperature of the lubrication oil to transfer more energy into the lubrication oil to reduce viscosity of the lubrication oil to cause better lubrication of the hydraulic fracturing pump.

12. The one or more machine-readable mediums of claim 10, wherein the electric motor operates at a fraction of maximum speed determined as a function of the temperature of the lubrication oil, during a fourth phase that is between the third phase and the fifth phase, while the temperature of the lubrication oil exceeds the second temperature threshold and the hydraulic fracturing pump is enabled to operate under pressure.

13. The one or more machine-readable mediums of claim 10 further comprising:
instructions to allow the lubrication oil temperature to increase still further once it is determined that the lubrication oil temperature is higher than the second threshold temperature; and
instructions to, in response to detecting that the lubrication oil temperature is higher than the second threshold temperature, enable the hydraulic fracturing pump to operate at a fraction of its maximum load.

14. The one or more machine-readable mediums of claim 10, wherein the electric motor operates at a frequency of approximately 3 Hz to achieve the first flowrate.

15. The one or more machine-readable mediums of claim 10 further comprising:
instructions to increase flow of the lubrication oil to a third flowrate in response to another detected increase in temperature and/or drop in viscosity of the lubrication oil.

16. The one or more machine-readable mediums of claim 15 further comprising:
instructions to present, on a display device, a warning message indicating an electrical current threshold of the electric motor has been exceeded.

17. An apparatus comprising:
a processor;
one or more machine-readable mediums including instructions that, when executed by the processor, for controlling lubrication of a hydraulic fracturing pump, the instructions comprising
instructions to pump, in a first phase, via an electric motor and a lubrication pump, unless a locked rotor condition for the lubrication pump is detected, lubrication oil through the hydraulic fracturing pump in a disabled state at a first flowrate determined by an operating frequency of approximately 5 hertz or less for the electric motor after determining that a temperature of the lubrication oil is less than a first temperature threshold;
instructions to increase flow of the lubrication oil, in a second phase, to a second flowrate determined by an increased operating frequency while maintaining the hydraulic fracturing pump in the disabled state in response to a detected increase in temperature of the lubrication oil over the first temperature threshold and below a second temperature threshold;
instructions to enable limited operation of the hydraulic fracturing pump, in a third phase when the temperature of the lubrication oil exceeds the second temperature threshold or the increased operating frequency exceeds a frequency threshold; and
instructions to enable full operation of the hydraulic fracturing pump, in a fifth phase, when the temperature of the lubrication oil exceeds a minimum operating temperature, until the temperature of the lubrication oil exceeds a shutdown temperature in a seventh phase, or until a pressure of the lubrication oil is below a lower limit in an additional phase.

18. The apparatus of claim 17 further comprising:

instructions to present, while pumping the lubrication oil at first flow rate, an indication that the electric motor is drawing more electrical current than a rated maximum current limit.

19. The apparatus of claim 17, wherein the electric motor operates at a fraction of maximum speed determined as a function of the temperature of the lubrication oil, during a fourth phase that is between the third phase and the fifth phase, while the temperature of the lubrication oil exceeds the second temperature threshold and the hydraulic fracturing pump is enabled to operate under pressure.

20. The apparatus of claim 17 further comprising:

instructions to detect that the lubrication oil temperature is higher than the second threshold temperature; and instructions to, in response to detecting that the lubrication oil temperature is higher than the second threshold temperature, enabling the hydraulic fracturing pump to operate at a fraction of its maximum load.

21. The apparatus of claim 20, wherein the electric motor operates at a frequency of more than approximately 10 Hz to achieve the second flowrate.

22. The apparatus of claim 17 further comprising:

instructions to increase the flow of the lubrication oil to a third flowrate in response to a detected drop in viscosity of the lubrication oil.

23. The apparatus of claim 17 further comprising:

instructions to present, on a display device, a warning message indicating no lubrication flow using a flow sensor that can result in shutting off the hydraulic fracturing pump, the lubrication pump, or the electric motor, to prevent damage.

* * * * *